Dec. 25, 1928.

W. F. COCHRAN

LOCK NUT

Filed Feb. 9, 1926

1,696,523

WILLIAM F. COCHRAN
INVENTOR.

BY R. W. Smart

ATTORNEY.

Patented Dec. 25, 1928.

1,696,523

UNITED STATES PATENT OFFICE.

WILLIAM F. COCHRAN, OF LOS ANGELES, CALIFORNIA, ASSIGNOR TO RAYMOND H. OSBRINK, OF LOS ANGELES, CALIFORNIA.

LOCK NUT.

Application filed February 9, 1926. Serial No. 87,103.

This invention is a nut, which after being threaded onto a bolt, can only be removed by the use of special tools and by exercising appreciable effort.

It is the particular object of the invention to provide a nut of extremely simplified and inexpensive construction, which may be tightened on a bolt by a usual wrench; and which when in place, and without extra operations, is so disposed as to make it impossible for an unauthorized person to remove the nut without employing such special tools and such an involved method of procedure as to immediately call attention to the contemplated thievery.

The improved nut is specifically adapted for use in connection with bolts employed to secure various accessories and attachments to motor vehicles, the stealing of which accessories has assumed alarming proportions; but it will be understood that the invention does not contemplate limiting the nut to any such specific use, since it is of general utility as a means for preventing accidental or unauthorized removal.

More particularly it is the object of the invention to provide a nut having a head readily gripped by a wrench for tightening the nut, and so constructed that continued turning of the nut after it is tightened, will readily break off that portion of its head which is engaged by a wrench, in order to lock the remaining portion of the nut on the bolt by the twisting of the broken ends of the threads, and leave exposed only a surface which affords no means for gripping the same.

Figure 1:
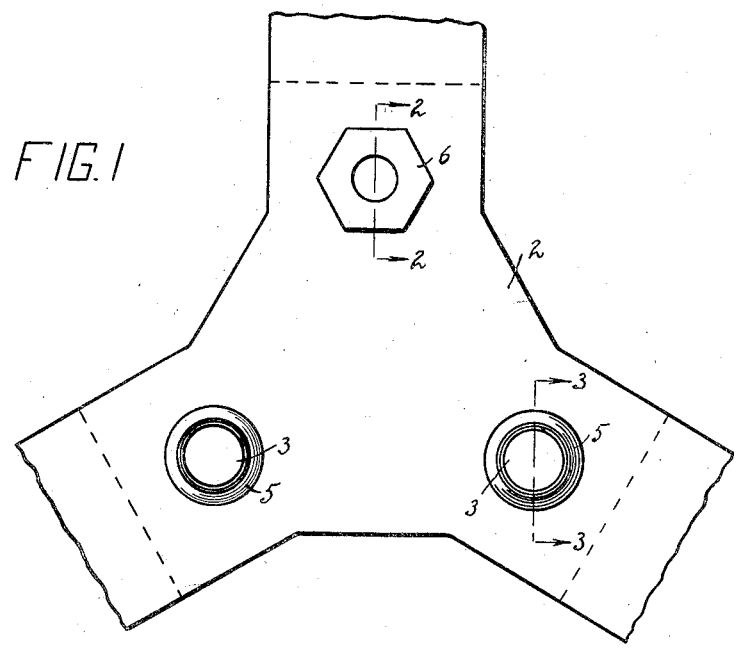

The invention will be readily understood from the following description of the accompanying drawings, in which:

Fig. 1 is a front elevation of a tire rack mounted on a bracket of an automobile by bolts employing the improved nuts.

Figure 2:
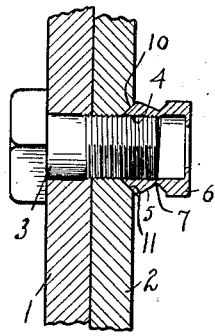
Figure 3:
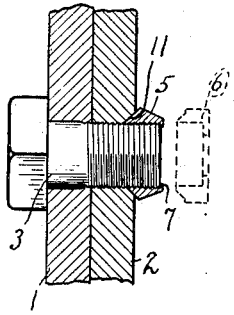

Figs. 2 and 3 are transverse sections on the lines 2—2 and 3—3 of Fig. 1.

Figure 4:
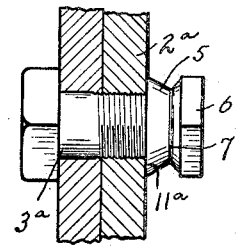

Fig. 4 is a view similar to Fig. 2 but showing a modified form of the invention.

As an example of one specific construction adapted for use of the improved nuts, I have shown a bracket 1 which is mounted on the rear of an automobile, and a spider 2 which supports an annular rack for a spare tire, connected to the bracket by bolts 3. When the usual nuts are threaded onto the bolts, it is an easy matter for a thief to remove the nuts and steal the tire rack and the spare rim and tire, irrespective of the locking of the tire to the rack. By using the nuts forming the subject matter of this invention, it is impossible to remove the nuts without first driving the autmobile to a machine shop where the tools are available for performing the necessary operations.

As a consequence it will be seen that while the improved nuts provide protection against the usual operations of a sneak-thief, it is still possible for an authorized person to remove the nuts when so desired.

The nuts each have a usual threaded bore 4 extending through a frustro-conical inner end 5 of the nut, and the outer end of the bore 4 is preferably smooth and extends through a polygonal head 6 which is connected by a restricted neck 7 to the tapering end of the member 5. The head 6 is thus adapted for engagement by a usual wrench for screwing the nut onto bolt 3 as shown at the upper portion of Fig. 1 and in Fig. 2, and the material reduction in the thickness of the metal surrounding bore 4 at the restricted neck 7, is such that continued turning of the nut after it has been tightened, will readily break off the head 6 as shown at the lower portion of Fig. 1 and in Fig. 3.

The nut is of cold rolled carbon steel or other suitable material which will break sharply at the neck 7 when a reasonable twisting strain is exerted by manual operation of a wrench; and the threads of bore 4 extend all the way to the point of breakage at neck 7, so that broken ends of the threads are exposed and will be twisted over the end of the bolt when head 6 is twisted off.

The frustro-conical nut 5 is thus locked against accidental backing off, by the distortion of the broken thread ends; and the conical surface of the member 5 precludes the possibility of gripping it by any usual tool for unscrewing the nut.

In the form of the invention illustrated in Figs. 1 to 3, the spider 2 is countersunk as shown at 10 at the openings for bolts 3; and in order that the nuts may seat tightly in the countersunk bores, the inner end of member 5 is tapered as shown at 11 in accordance with the taper of the countersunk bore.

It will be apparent however, that the invention is not limited to use in connection with the tire rack construction illustrated in Fig. 1, but is of general utility wherever it is desired to lock a nut against accidental or unauthorized removal; and the nut may therefore be of the modified form illustrated in Fig. 4, in which the inner face 11ª of the nut abuts squarely against a non-countersunk face of a member 2ª through which a bolt 3ª extends.

While the nuts with their heads twisted off as shown at the lower portion of Fig. 1, cannot be gripped by a wrench or the like for quickly and inconspicuously unscrewing the nuts as is essential to the successful operation of a sneak-thief; still it is possible for an authorized person, when it is desired to remove the nuts for any purpose, to draw the temper from the material forming the same, so that holes may be drilled radially in the sides of the nuts and a suitable tool inserted therein for unscrewing.

I claim:

1. A nut having a threaded bore adapted to engage a bolt and comprising an inner end having a frustro-conical surface and an outer end forming a polygonal head connected to the inner end by a restricted neck which reduces the thickness of the material between the threaded bore and the exterior of the neck so that the polygonal head may be readily twisted off at the restricted neck when the nut is tightened on the bolt in order to bend the broken ends of the threads of the bore over the end of the bolt and leave the inner end of the nut having its exterior surface non-parallel to its axis fixed on the bolt.

2. A nut having a threaded bore adapted to engage a bolt and comprising inner and outer ends connected by a restricted neck, the inner end tapering to a reduced diameter toward the neck and having an exterior surface which throughout its entire length is non-parallel to the axis of the nut, the outer end of the nut forming a head adapted for engagement for turning the nut, and the restricted neck so reducing the thickness of the nut between its threaded bore and the exterior of the neck as to permit the head being readily twisted off at the neck when the nut has been tightened on a bolt, in order to bend the broken ends of the threads of the bore over the end of the bolt.

In testimony whereof I have affixed my signature to this specification.

WILLIAM F. COCHRAN.